UNITED STATES PATENT OFFICE 2,583,464

PROCESS OF MAKING A PHYSIOLOGICALLY-ACTIVE VITAMIN PREPARATION

Jörgen Brabaek, Copenhagen, Denmark, assignor to Aktieselskabet "Vølund," Copenhagen, Denmark, a Danish company No Drawing. Application January 24, 1950, Serial No. 140,341. In Denmark November 16, 1942

9 Claims. (Cl. 167—81)

This invention relates to the preparation of stable, physiologically-active compositions and is more particularly concerned with a method of treating vitamin-containing vegetables to form stable preparations utilizing the physiologically active constituents of the vegetables.

Vegetables are known to contain varying quantities of vitamins and pro-vitamins. These physiologically-active constituents are of great importance in human and animal nutrition and are generally associated with the watery medium enclosed in the cells of the vegetable tissue. Since all raw vegetables are subject to deterioration, with subsequent loss or depletion of their content of vitamins and pro-vitamins, various attempts have been made to treat the raw vegetables to recover or preserve the physiologically-active values. Such attempts have generally involved the desiccation or dehydration of the vegetables as a preliminary step, followed by a recovery of the portions of the desiccated vegetable matter containing the vitamin and pro-vitamin values. This method of treatment, however, has the disadvantage that significant quantities of the vitamins and pro-vitamins are destroyed, or at least inactivated, by the preliminary desiccation step and the heretofore known processes for recovering or preserving the desired vitamin and pro-vitamin values have been time consuming and have required numerous manipulative steps. As a result, compositions of relatively low vitamin content, as compared with the vitamin content of the vegetable treated, have been produced. Supplementary additions of vitamins have frequently been necessary in order to obtain a product of adequate vitamin content. In some cases no particular attempt has been made to preserve the vitamin values, and the materials have been subjected to a series of operations including a dehydration step and have then been mixed with a vitamin-containing oil, the vegetable merely being used as a carrier for the separately prepared vitaminized oil.

It is an object of the present invention to provide a method of preparing stable, vitamin-containing vegetable preparations which avoids the above-enumerated disadvantages.

It is a further object of the invention to provide a method by means of which water contained in the vegetable cells may be removed without adversely affecting the vitamin content thereof.

It is a still further object of the invention to provide a process whereby the water in the vegetable may be substantially replaced by a fatty vehicle to produce a stable product having a significant nutritional value and not requiring the addition of supplementary vitamins.

Other objects will be apparent from the following detailed description.

In accordance with the invention, the vegetable to be treated is comminuted, preferably after the vegetable has been heated in a moist atmosphere, e. g., by boiling in water or steaming, an edible fatty vehicle such as edible oil or fat, is added to the comminuted mass and the constituents intimately mixed, and preferably homogenized. Simultaneous removal of water and replacement of the water in the cells of the vegetable by the added fatty vehicle are then effected by exposing a relatively thin layer or film of the mass to a rapidly flowing current of air.

In accordance with this process, there may be obtained stable, physiologically-active compositions comprising the vitamin and fibrous constituents of the vegetables treated combined with a fatty vehicle which has replaced a large proportion of the water originally present in the vegetable. The process of the invention effects the simultaneous removal of water and replacement by the fatty vehicle with the result that the disadvantageous effects of prior vegetable treating methods are avoided. Depending upon the quantity of fatty vehicle added, there may be obtained a product which is in the form of a vitamin-rich powder, the fatty vehicle content being low with respect to the quantity of vegetable fiber, or there may be obtained a somewhat fluid product which may be used as such, for example, as a fortifying additive for animal fodder, or which may be passed through a filter press to remove any desired quantity of vitamin-rich fatty fluid. The fatty fluid may be used for the vitamin fortification of food stuffs such as margarine, and the fibrous vitamin-containing residue may be used as a nutritious animal fodder. The herein described process permits, therefore, the production of a variety of stable, physiologically-active substances.

The foregoing process is applicable to the treatment of the various types of vegetables such as root vegetables, leafy vegetables and the like in their normal hydrated state. Vegetables having a relatively high vitamin and pro-vitamin content are the most suitable; particularly advantageous results have been obtained with carrots and spinach. The vegetables are employed in the raw state and, preferably, fresh vegetables are used.

The heat treatment of the hydrated vegetable is effected in a moist atmosphere, i. e., under conditions such that dehydration does not occur and, as a result, at the end of the treatment the vegetables have the same moisture content, and in some cases a greater moisture content, than they had before treatment. This preliminary heat treatment is carried out at the boiling temperature of water and at a pressure of 1 to 2½ atmospheres. The heat treatment results in the opening of the cells of the vegetables and for best results should ordinarily be carried out for about 30 minutes at atmospheric pressure. At higher temperatures, treatment for a shorter time is generally sufficient; for example, at 2 atmospheres pressure (absolute), at which pressure the boiling point of water is about 120° C., a heating period of about 15 minutes is sufficient. While treatment with steam is the preferred method of heat treatment, boiling in water also produces satisfactory results.

The comminution of the vegetables is preferably effected after the aforementioned heat treatment has been carried out, since after heat treatment the materials are considerably softer. If desired, however, comminution may be effected before heat treatment. When the vegetables are comminuted after heating, it is advantageous to do so while the vegetables are still hot. Comminution of the vegetables may be carried out in any convenient chopping or crushing device. A screw chopper, for example, has been found to be particularly suitable. The vegetables are comminuted sufficiently to reduce them to a mash.

Following the comminution step, an edible oil or fat is added to the comminuted material and through mixing, and preferably homogenization, of the mixture carried out. Homogenization is conveniently carried out by methods known in the art of milk homogenization, i. e., by the application of high pressures whereby a breaking up of the fatty globules is effected and a stable dispersion of the materials is obtained. Homogenization is advantageously carried out at 40° to 60° C. and at a pressure of 75 to 200 atmospheres. A thorough intimate mixing is possible, however, by employing a disintegrator and thereafter passing the materials through a fine mesh screen. The edible fatty vehicle added to the comminuted vegetable matter may be any edible oil or fat such as ground nut oil, e. g., peanut oil, olive oil, corn oil, cotton seed oil, butter, hydrogenated cotton seed oil, and the like. The quantity of fatty vehicle added may vary over a wide range depending upon the consistency desired in the finished product, i. e., whether an oil-containing vitamin product is wanted, e. g., for use as an additive for animal fodder, or a vitamin-containing oil, e. g., for use in the manufacture of therapeutic products of the vitamin fortification of margarine. Preferably, 3 to 10 per cent of the edible fatty vehicle, based on the weight of the comminuted material, is employed.

The mixture of comminuted vegetables, and oil or fat is dehydrated under conditions which permit a rapid removal of substantially all or an appreciable proportion of the water and the simultaneous replacement of the water in the vegetable fiber structure by the fatty vehicle. Dehydration is thereby effected without adverse effect upon the vitamin and pro-vitamin values. In practice, dehydration is carried out by spreading the materials in a thin layer, e. g., a layer or film having a thickness of between 0.05 mm. and 0.5 mm., upon a heated surface, e. g., a conveyor or drum and the layer of material is then, after about 1 to 3 seconds, brought into contact with an air current moving at a velocity of about 50 to 100 feet per second. The air need not be pre-heated and is preferably at room temperature, i. e., 20° to 25° C. The conveyor or drum is preferably heated, as by steam, to a temperature of about 100° C. The material is allowed to remain on the heated conveyor or drum for only a short period of time, e. g., 10 to 30 seconds depending upon the thickness of the layer of material; the thinner the layer, the shorter the time necessary. In practice, 95-98% of the water is removed from the comminuted hydrated product. While various means may be used, the apparatus described in U. S. Patent 1,933,960 is an example of a particularly suitable means for carrying out the dehydration step. The dehydration of the mass is thus effected at a relatively low temperature and at an extremely rapid rate. As the water is removed during this dehydration step, the oil or fat penetrates the cells of the comminuted vegetable matter, simultaneously replacing the water therein, and dissolves the vitamins and pro-vitamins to produce a stable vitamin-rich product which may be stored without deterioration for long periods of time. The stability period may be increased by compressing the product to a more compact form, with or without the addition of edible binding materials.

The character of the finished dehydrated product depends to a large extent upon the quantity of oil or fat added during the mixing or homogenization step. If only a small quantity has been added, e. g., 3 per cent, the final product is almost a powder, whereas if greater quantities of oil or fat have been added, e. g., 10 per cent, then the final product is in the form of a fiber-containing emulsion. Generally speaking, the final product contains 20 to 45 per cent oil or fat; 40 to 70 per cent cellular or fibrous components, and 10 to 15 per cent water, the vitamins and pro-vitamins being contained in the oil.

The following specific examples are further illustrative of the invention, without however, in any way being intended as a limitation.

Example 1

One hundred parts of carrots are cleaned and steam cooked for 30 minutes at 100° C. and 1 atmosphere absolute pressure and thereafter the carrots are chopped in a screw chopper and mixed with 10% by weight of ground nut oil. This mixture is homogenized at a pressure of 150 atmospheres and at a temperature of about 50° C. The homogenized mass is then dehydrated by spreading the material in a layer of about 0.2 mm. thickness on the surface of a rotating drum heated to 100° C., and exposing the layer of material to a stream of non-saturated air having a temperature of about 20° C. and a velocity of about 65 ft./sec. After about 15 seconds of exposure, the material is scraped off the drum as a soft, oily mass, containing about 45% oil, 43% fibers and 12% water.

Example 2

One hundred parts of spinach are cleaned and steam boiled, for about 15 minutes at 120° in a pressure cooker at 2 atmospheres (absolute) pressure. The spinach is then comminuted in a screw chopper and mixed with about 5% by weight of ground nut oil. The mixture is homogenized at 50° at a pressure of 120 atmospheres by treatment in a homogenizer. The homogenized mixture is then spread in a layer of about 0.2 mm. thickness on a rotating drum heated to 100° C, and exposed for about 15 seconds to a current of air having a temperature of 20° C. and a velocity of 65 ft./sec. The material is then scraped off the drum as a soft pasty mass containing about 30% oil, 57% fibers and 13% water.

*Example 3*

One hundred parts of carrots are cleaned and steam boiled for about 30 minutes at 100° C. at atmospheric pressure and then conveyed through a screw chopper and mixed with about 3% by weight of ground nut oil. This mixture is homogenized at 50° C. and at a pressure of 100 atmospheres and the material is then spread on the surface of a rotating drum heated by steam at 100° C. The mixture is spread in a layer of 0.2 mm. thickness and is immediately carried through a desiccating section in which it is exposed to a stream of non-saturated air having a temperature of 20 to 25° C. and a velocity of about 65 ft/sec. After about 15 seconds of exposure to the current of air, the material is scraped off the drum as an almost dry powder consisting of about 21% oil, 66% fibers and 13% water.

*Example 4*

One hundred parts of carrots are cleaned and steam cooked for about 30 minutes at 100° C. at atmospheric pressure. The cooked carrots are then comminuted in a screw chopper and mixed with about 3% by weight of butter. The mixture is homogenized at a pressure of 150 atmospheres and at a temperature of about 50° C. The homogenized mass is then spread in a layer of about 0.2 mm. thickness on a rotating drum internally heated by steam to a temperature of about 100° C., and the layer of material exposed to a current of air moving across the material with a velocity of about 65 ft/sec. and having a temperature of 20 to 25° C. After about 15 seconds of exposure to the rapidly moving current of air, the material is scraped off the drum as an almost dry powder consisting of about 21% oil, 66% fibers and 13% water.

The products produced in the foregoing examples are vitamin-rich products suitable as additives for fodder or for the vitamin fortification of other animal and human food stuffs. The product of Examples 1 or 2 is conveniently passed through a filter press to produce a vitamin-rich oil suitable, for example, for the fortification of margarine, and a vitamin-containing fibrous residue, eminently suited as a nutritous fodder.

This application is a continuation-in-part of my co-pending application, Serial No. 700,362, filed October 1, 1946 now abandoned.

What I claim and desire to secure by Letters Patent is:

1. A process for producing a stable, physiologically active preparation from hydrated vegetables containing physiologically-active fat-soluble vitamins and pro-vitamins, which comprises heating said vegetables in the presence of moisture, comminuting the vegetables, intimately mixing the comminuted vegetables with a substance selected from the group consisting of edible oils and fats, and rapidly removing a substantial portion of the water contained in the mixture by exposing a layer of the mixture to a rapidly-moving current of air, whereby there is effected simultaneous removal of water from the cells of the comminuted vegetables and replacement of said water in said cells by the said substance.

2. A process for producing a stable, physiologically active preparation from hydrated vegetables containing physiologically-active fat-soluble vitamins and pro-vitamins, which comprises heating said vegetables in the presence of moisture, comminuting the vegetables, homogenizing the heated comminuted vegetables with a substance selected from the group consisting of edible oils and fats, and rapidly removing a substantial portion of the water contained in the homogenized mass by exposing a layer of the mass to a rapidly-moving current of air at room temperature, whereby there is effected simultaneous removal of water from the cells of the comminuted vegetables and replacement of said water in said cells by the said substance.

3. A process for producing a stable, physiologically active preparation from hydrated vegetables containing physiologically-active fat-soluble vitamins and pro-vitamins, which comprises heating said vegetables in the presence of moisture, comminuting the vegetables, intimately mixing the comminuted vegetables with a substance selected from the group consisting of edible oils and fats, and removing a substantial portion of the water contained in the mixture by exposing a layer of the mixture to a current of air having a velocity of 50 to 100 ft./sec., whereby there is effected simultaneous removal of water from the cells of the comminuted vegetables and replacement of said water in said cells by the said substance.

4. A process for producing a stable, physiologically active preparation from hydrated vegetables containing physiologically-active fat-soluble vitamins and pro-vitamins, which comprises heating said vegetables in the presence of moisture, comminuting the vegetables, homogenizing the heated comminuted vegetables with 3 to 10% by weight of a substance selected from the group consisting of edible oils or fats, and removing a substantial portion of the water contained in the homogenized mass by exposing a layer of the mass to a rapidly-moving current of air for a period of 10 to 30 seconds, whereby there is effected simultaneous removal of water from the cells of the comminuted vegetables and replacement of said water in said cells by the said substance.

5. A process for producing a stable, physiologically active preparation from hydrated carrots containing physiologically-active fat-soluble vitamins and pro-vitamins, which comprises heating said carrots in the presence of moisture, comminuting the carrots, homogenizing the heated comminuted carrots with a substance selected from the group consisting of edible oils and fats, and removing a substantial portion of the water contained in the homogenized mass by exposing a layer of the mass for a short period of time to a rapidly-moving current of air, whereby there is effected simultaneous removal of water from the cells of the comminuted carrots and replacement of said water in said cells by the said substance.

6. A process for producing a stable, physiologically active preparation from hydrated spinach containing physiologically-active fat soluble vitamins and pro-vitamins, which comprises heating said spinach in the presence of moisture, comminuting the spinach, homogenizing the heated comminuted spinach with a substance selected from the group consisting of edible oils and fats, and removing a substantial portion of the water contained in the homogenized mass by exposing a layer of the mass for 10 to 30 seconds to a rapidly-moving current of air, whereby there is effected simultaneous removal of water from the cells of the comminuted spinach and replacement of said water in said cells by the said substance.

7. A process for producing a stable, physiologically active preparation from hydrated vegetables containing physiologically-active fat-soluble vitamins and pro-vitamins, which comprises heating said vegetables in the presence of moisture, comminuting the vegetables, intimately mixing the comminuted vegetables with 3 to 10% by weight of a substance selected from the group consisting of edible oils and fats, and rapidly removing a substantial portion of the water contained in the mixture by exposing the mixture as a layer of 0.05 mm. to 0.5 mm. thickness to a current of air moving with a velocity of 50 to 100 feet per second, whereby there is effected simultaneous removal of water from the cells of the comminuted vegetables and replacement of said water in said cells by the said substance.

8. A process for producing a stable, physiologically active preparation from hydrated vegetables containing physiologically-active fat-soluble vitamins and pro-vitamins, which comprises heating said vegetables in the presence of moisture, comminuting the vegetables, homogenizing the heated comminuted vegetables with 3 to 10% by weight of ground nut oil, and removing a substantial portion of the water contained in the homogenized mass by exposing a layer of the mass to a rapidly-moving current of air for a period of 10 to 30 seconds, whereby there is effected simultaneous removal of water from the cells of the comminuted vegetables and replacement of said water in said cells by the said oil.

9. A process for producing a stable, physiologically active preparation from hydrated vegetables containing physiologocially-active fat-soluble vitamins and pro-vitamins, which comprises heating said vegetables in the presence of moisture, comminuting the vegetables, homogenizing the heated comminuted vegetables with 3 to 10% by weight of an edible oil and removing a substantial portion of the water contained in the homogenized mass by exposing a layer of the mass to a rapidly-moving current of air for a period of 10 to 30 seconds, whereby there is effected simultaneous removal of water from the cells of the comminuted vegetables and replacement of said water in said cells by the said oil.

JÖRGEN BRABAEK.

REFERENCES CITED

The following references are of record in the file of this patent:

UNITED STATES PATENTS

| Number | Name | Date |
|---|---|---|
| 1,933,960 | Brabaek | Nov. 7, 1933 |
| 1,997,083 | Robison | Apr. 9, 1935 |
| 2,198,214 | Musher | Apr. 23, 1940 |
| 2,282,797 | Musher | May 12, 1942 |

FOREIGN PATENTS

| Number | Country | Date |
|---|---|---|
| 62,048 | Denmark | Mar. 6, 1944 |
| 112,963 | Sweden | Nov. 23, 1944 |
| 573,937 | Great Britain | Dec. 13, 1945 |

OTHER REFERENCES

Steenbock, Journal of Biological Chemistry, vol. 42, pps. 131 to 136 (1920).